July 16, 1929. T. P. SMITH 1,720,765

BRAKE LINING

Filed June 9, 1923

Inventor
T. P. Smith,
By Robert H. Young
Attorney

Patented July 16, 1929.

1,720,765

UNITED STATES PATENT OFFICE.

TALCOT P. SMITH, OF RANTOUL, ILLINOIS.

BRAKE LINING.

Application filed June 9, 1923. Serial No. 644,449.

This invention relates in general to a method of and means for securing a lining of fabric or the like to a metal member and more particularly relates to a method of and means for securing the usual fabric lining to a brake shoe, clutch member, or any surface used for gripping or clutching.

In the common practice of securing such a liner to a brake shoe or the like, the metal member is perforated and rivets driven through the liner and through these perforations are used to hold the members together. Such a method of securing a liner to a metal obviously has many defects. The heads of the rivets used as the liner securing means are substantially flush with the wearing surface of the liner so that after a little wear they come in contact with the brake drum and the efficiency of the liner is greatly lessened if not totally destroyed. Furthermore, the strains taken up by the liner are exerted on the comparatively small shank or stem of the rivet with the result that the lining is worn and loosened at this point to the extent that the brake will "chatter" or alternately grab and slip.

It is the prime object of my invention to provide a method of and means for securing a liner to a brake shoe or the like in such a way that the head of the retaining rivets will not contact with brake drum or the like until the lining is almost completely worn out.

A further object of my invention is to so construct my liner securing means that the lining is drawn into a depression in the metal member to provide against the liner slipping.

Further objects of my invention will be found in the following specifications and claims and will be disclosed in the accompanying drawings in which Figure 1 is a perspective view of a brake band embodying my invention.

Figure 1:
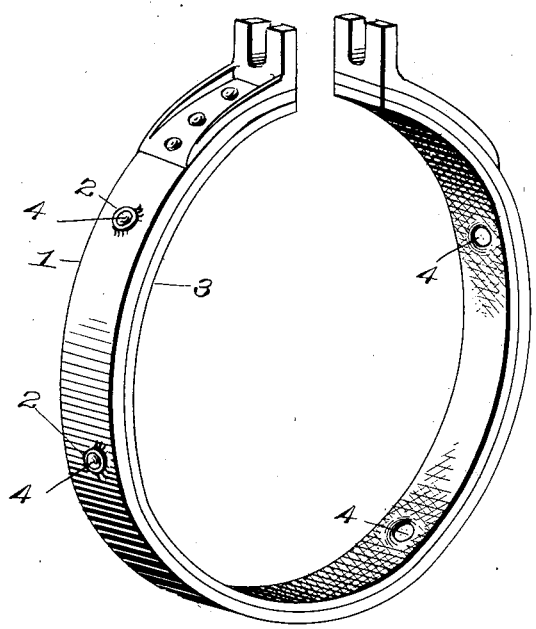
Figure 2:
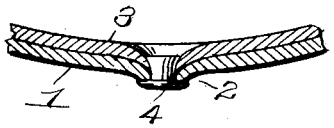
Figure 2 is an enlarged detail of a portion of the device shown in Figure 1.
Figure 3:
Figure 3 is an enlarged detail of a portion of the device shown in Figure 1.

Referring with greater particularity to the drawings it will be seen that the metal band or brake shoe 1 has a plurality of countersunk centrally disposed apertures 2. The brake shoe, as will be noted, has a gradually sloping curvature toward the countersunk apertures. The lining 3 of fabric or other suitable material is securely fastened at the ends of the brake shoe 1 and secured thereto throughout its length by rivets 4. The heads of the rivets are placed on the side of the shoe opposite the wearing surface and the opposite end of the rivet extends through the fabric and holds the same well down into the countersunk portion of the shoe.

It will be noted that the inner end of the rivets extends to a point just flush with the inner surface of the shoe so that the brake lining would necessarily be worn out completely before there could be any metal to metal bearing between the rivets and the brake drum. Furthermore, the lining is secured fixedly in position by being drawn down into the sloping portion of the shoe near the apertures and slippage of the lining or "chattering" of the brake is thus avoided. The fact that part of the strain of the brake effect is thus taken up by the frictional resistance between the lining and the sloping inner surfaces of the shoe adjacent the apertures prevents wearing or tearing of the liner against the shank of the rivets.

It will be noted that the countersunk apertures in the metal member are centrally disposed and are of comparatively limited diameter so that the strength and resiliency of the metal band will not be impaired. Furthermore, almost the entire wearing surface of the lining will be available for use. There will be a wearing surface throughout the whole length of the lining at the edges thereof and the only loss of surface will be at the small centrally disposed countersunk apertures and the surface immediately adjacent in sloping theretoward.

I claim:

1. In a device of the character described, a metal member, said member having a plurality of apertures countersunk therein, a flexible lining adapted to extend into said apertures and to aid in securing said liner to said metal member, rivets extending through said apertures and adapted to secure said lining to said metal member.

2. In a device of the character described, a metal member, said member having a plurality of apertures countersunk therein, a flexible lining adapted to extend into said apertures and to aid in securing said liner to said metal member, rivets extending through said apertures and adapted to secure said lining to said metal member, the ends of said securing means adjacent the wearing surface extending to a point substantially flush with the normal curvature of said metal member.

3. In combination, in a device of the character described, a metal member, a plurality of centrally disposed countersunk apertures in and extending longitudinally of said metal member, a flexible lining, rivets extending through said apertures and adapted to secure said lining to said metal member, the heads of said rivets being disposed on the side of the metal member opposite the lining, the opposite end of said rivets extending through said fabric and terminating at a point substantially in the same plane as the normal surface of said metal member.

4. A device of the character described, a curved metal member, said member having a plurality of apertures countersunk therein of appreciably less diameter than the width of said metal member, a flexible lining adapted to extend through said apertures and to aid in securing said liner to said metal member, rivets extending through said apertures and adapted to secure said lining to said metal member, the ends of said securing means adjacent the wearing surface extending to a point substantially flush with the normal curvature of said metal member.

5. In combination, in a device of the character described, a metal member, said member having a plurality of countersunk apertures therein, said metal member having a portion of limited diameter gradually sloping towards said countersunk apertures, a flexible lining, and means adapted to aid in securing said lining to said metal member in such a manner that a portion of said lining is drawn into the sloping portion of the said member adjacent said countersunk apertures.

6. In combination, in a device of the character described, a metal member, said member having a plurality of countersunk apertures therein, said metal member having a portion of limited diameter gradually sloping towards said countersunk apertures, a flexible lining, and means adapted to secure said lining to said metal member in such a manner that a portion of said lining is drawn into the sloping portion of the said member adjacent said countersunk aperture, said securing means terminating inwardly of the wearing surface of said lining.

7. In combination, in a device of the character described, a metal member, said member having a plurality of apertures countersunk therein, said metal member having a portion of limited diameter gradually sloping towards said countersunk apertures, a flexible lining, and means adapted to secure said lining to said metal member in such a manner that a portion of said lining is drawn into the sloping portion of the said member adjacent said countersunk apertures, said securing means terminating inwardly of the wearing surface of said lining by substantially the width of said lining.

8. A device of the character described, a metal member, a plurality of countersunk apertures in said member and of appreciably less diameter than the width of said member, flexible lining adapted to extend into said apertures and to aid in securing said liner to said metal member.

In testimony whereof I affix my signature.

TALCOT P. SMITH.